United States Patent
Swain (10) Patent No.: US 8,728,313 B2
(45) Date of Patent: *May 20, 2014

(54) FILTER SYSTEM WITH REMOVABLE ENHANCEMENT MEDIA

(71) Applicant: David E. Swain, Tarpon Springs, FL (US)

(72) Inventor: David E. Swain, Tarpon Springs, FL (US)

(73) Assignee: Paragon Water Systems, Inc., Clearwater, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/656,218

(22) Filed: Oct. 19, 2012

(65) Prior Publication Data

US 2013/0043174 A1 Feb. 21, 2013

Related U.S. Application Data

(63) Continuation of application No. 12/780,416, filed on May 14, 2010, now Pat. No. 8,308,942.

(51) Int. Cl.
| | |
|---|---|
| *B01D 35/00* | (2006.01) |
| *B01D 29/58* | (2006.01) |
| *C02F 1/68* | (2006.01) |
| *C02F 9/04* | (2006.01) |
| *C02F 9/08* | (2006.01) |

(52) U.S. Cl.
USPC ........ 210/256; 210/206; 210/237; 210/416.3; 210/435; 210/438; 210/443; 210/450

(58) Field of Classification Search
None
See application file for complete search history.

(56) References Cited

U.S. PATENT DOCUMENTS

| | | | |
|---|---|---|---|
| 4,693,820 A | | 9/1987 | Baxter |
| 5,277,802 A | * | 1/1994 | Goodwin ............... 210/202 |
| 5,843,309 A | | 12/1998 | Mancil |
| 6,001,249 A | | 12/1999 | Bailey et al. |
| 6,099,735 A | | 8/2000 | Kelada |
| 6,149,780 A | | 11/2000 | Miyake |
| 7,014,782 B2 | | 3/2006 | D'Emidio et al. |
| 8,308,942 B2 | * | 11/2012 | Swain ................. 210/256 |
| 2005/0000867 A1 | * | 1/2005 | Haynes et al. ............. 210/87 |
| 2006/0065607 A1 | * | 3/2006 | Bassett et al. ............. 210/767 |
| 2008/0020096 A1 | | 1/2008 | Blum et al. |
| 2008/0272054 A1 | | 11/2008 | Schlegel et al. |
| 2010/0006508 A1 | * | 1/2010 | Mitchell et al. ............. 210/669 |

* cited by examiner

*Primary Examiner* — Benjamin Kurtz
(74) *Attorney, Agent, or Firm* — Greer, Burns & Crain, Ltd.

(57) ABSTRACT

A water filter system including a base configured for receiving water from a faucet and a filter cartridge connected to the base. The filter cartridge defines a peripheral opening and a first chamber having at least one filter element, and a second chamber in fluid communication with the first chamber. An enhancement cartridge is removably inserted through the peripheral opening and into the second chamber. The enhancement cartridge includes an enhancement material for adding minerals to the water and is removable from the system independently from the filter cartridge.

10 Claims, 7 Drawing Sheets

FILTER SYSTEM WITH REMOVABLE ENHANCEMENT MEDIA

PRIORITY CLAIM

This application is a continuation application of and claims the benefit of U.S. patent application Ser. No. 12/780,416 filed on May 14, 2010, which is incorporated herein in its entirety.

BACKGROUND

The present invention relates generally to water treatment devices, and more particularly to countertop residential filtration units connected to existing faucets.

To improve odor, taste and/or remove contaminants from already potable drinking water provided to residential users, many people install supplemental water filtration systems. Conventional residential water treatment systems are typically classified as whole house, under the counter mount, faucet mount and countertop mounted units. Most faucet mounted and countertop filter systems allow users to switch between filtered water for drinking and unfiltered water for washing dishes and other household activities where filtered water is not needed.

Conventional residential water filter systems typically include filter units that become filled with impurities over time and therefore need to be replaced periodically. Some of these systems also include an enhancement material which includes minerals that are added to the filtered water. An important design criteria for such filter units is the efficient utilization of filter cartridges and enhancement materials.

SUMMARY

A filter system is provided including a filter cartridge and an enhancement cartridge removably inserted in the filter cartridge. By making the enhancement cartridge independently removable from the filter cartridge, only one of the cartridges needs to be replaced at a time, thereby reducing waste of the filtering materials and costs associated with such systems.

More specifically, a water filter system is provided that includes a base configured for receiving water from a faucet and a filter cartridge connected to the base. The filter cartridge defines a peripheral opening, a first chamber having at least one filter element, and a second chamber in fluid communication with the first chamber. An enhancement cartridge is removably inserted through the peripheral opening and into the second chamber and includes an enhancement material for adding minerals to the water. The enhancement cartridge is removable from the system independently from the filter cartridge.

In another embodiment, a water filter system is provided that includes a base including a bottom support and a vertical support transversely extending from the bottom support. The bottom support includes an incoming water port for receiving unfiltered water and an outgoing water port for receiving filtered water. A filter cartridge is connected to the base adjacent to the vertical support and includes at least one filter element for removing impurities from the water. The filter cartridge includes a water inlet and a water outlet where the water inlet and the water outlet are respectively in fluid communication with the incoming water port and the outgoing water port. An enhancement cartridge is located in and in fluid communication with the filter cartridge and includes an enhancement material for adding minerals to the filtered water. The enhancement cartridge is independently removable from the filter cartridge while the filter cartridge is connected to the base. A cover is configured to enclose the filter cartridge and the vertical support and engage the bottom support.

In a further embodiment, a water filter system is provided that includes a base configured for receiving water from a faucet and a filter cartridge connected to the base, the filter cartridge defining a first chamber having at least one filter element, and a second chamber in fluid communication with the first chamber. An enhancement cartridge is removably inserted in the filter cartridge and includes a housing and a handle member removably connected to the housing, where the housing includes an enhancement material for adding minerals to the water and where the enhancement cartridge is independently removable from the filter cartridge while the filter cartridge is connected to the base. In situations where no minerals are to be added to the water, the enhancement cartridge is removed from the filter cartridge and the handle member is removed from the housing and re-inserted in the filter cartridge.

DETAILED DESCRIPTION

Figure 1:
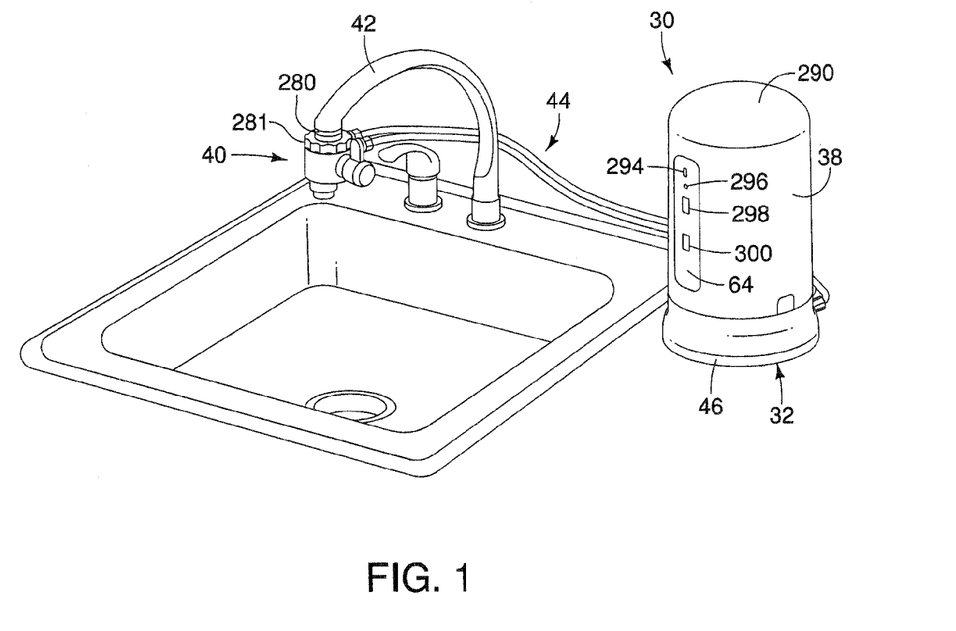
FIG. 1 is a perspective view of the present water filter system attached to a faucet.
Figure 2:
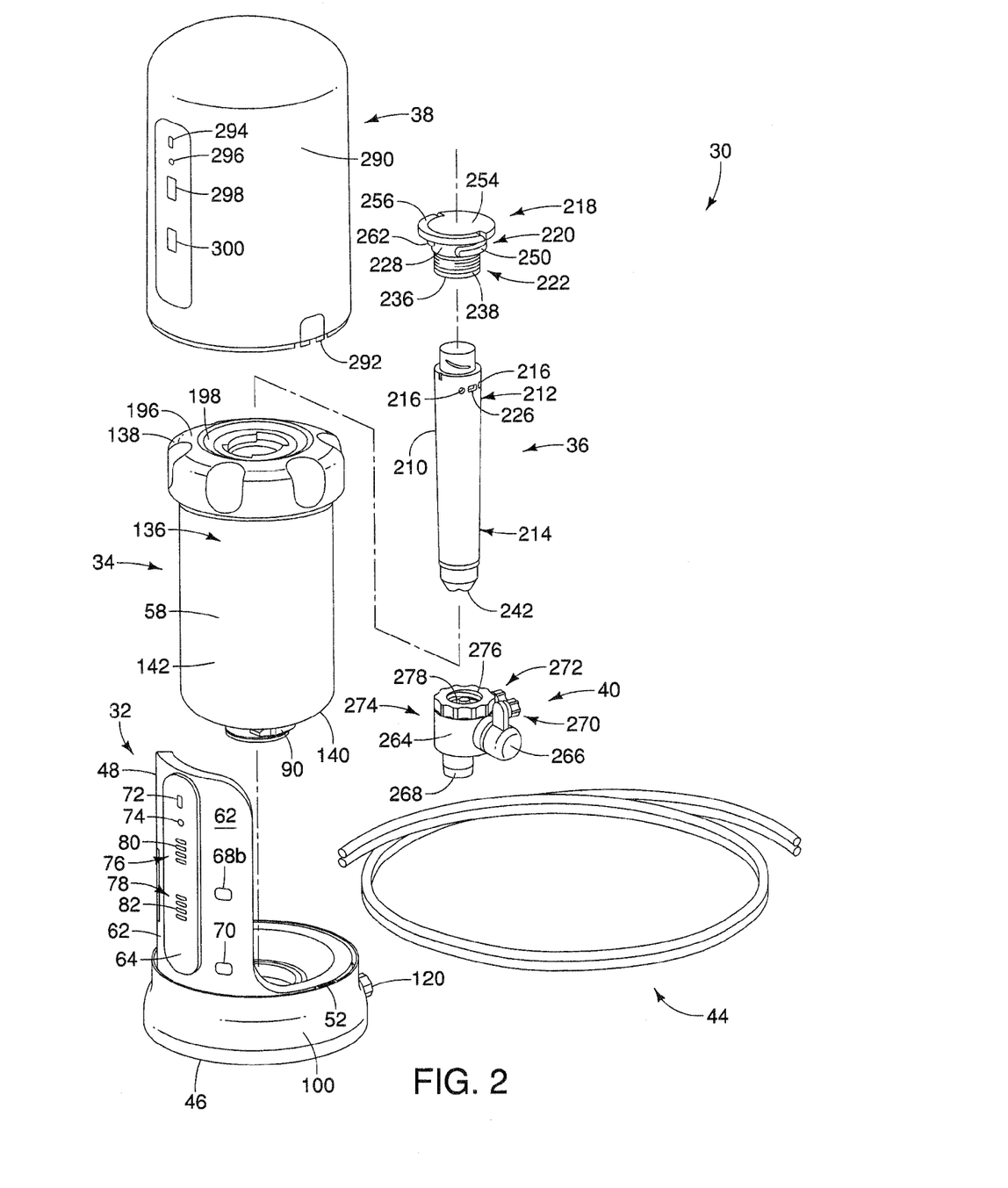
FIG. 2 is an exploded perspective view of the water filter system of FIG. 1.

Referring now to FIGS. 1-2, a filter system, generally designated 30, is used in homes and businesses to filter water used for drinking, cooking and other functions in which clean water is desired. The present filter system 30 includes a filter base 32 placed on a countertop or similar surface, a removable filter cartridge 34 that is sits in the filter base and includes a removable enhancement cartridge 36, and a cover 38 that encloses the filter cartridge and engages the filter base. A diverter valve 40 attaches to a faucet 42 and diverts incoming water to the filter system 30 via suitable tubing 44 where the water is filtered and returned to the faucet for dispensing into a cup or other container.

Figure 3:
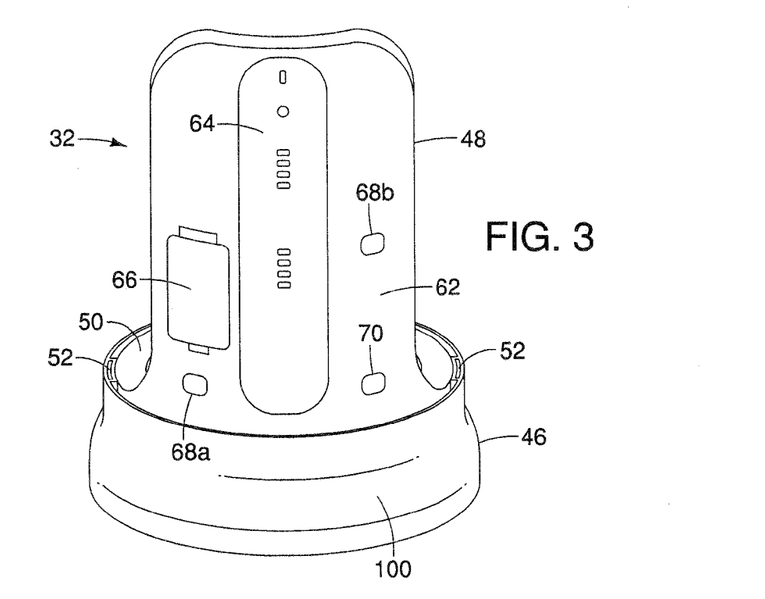
FIG. 3 is a front elevation view of the filter base shown in FIG. 2.
Figure 4:
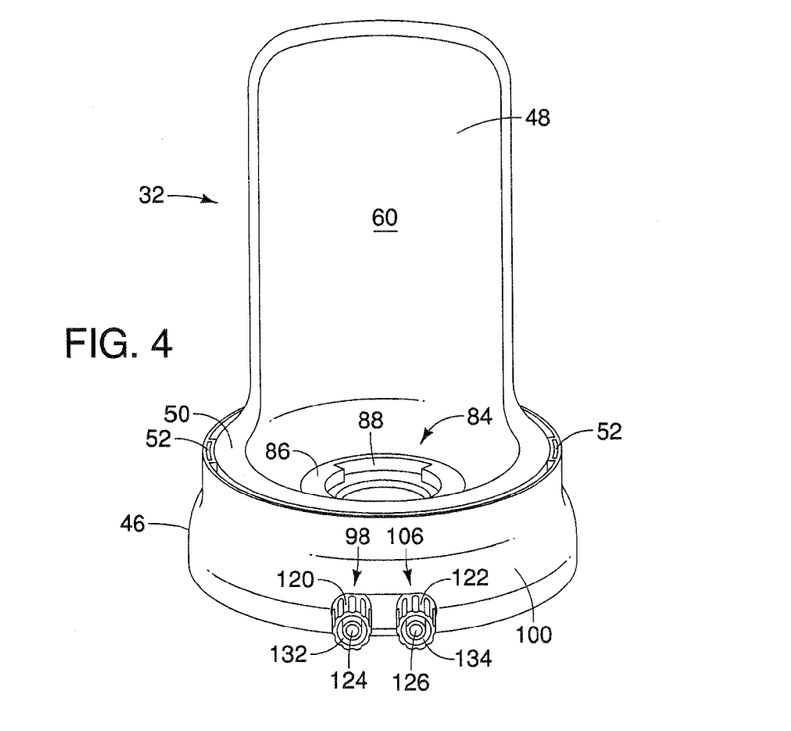
FIG. 4 is a rear elevation view of the filter base of FIG. 3.
Figure 5:
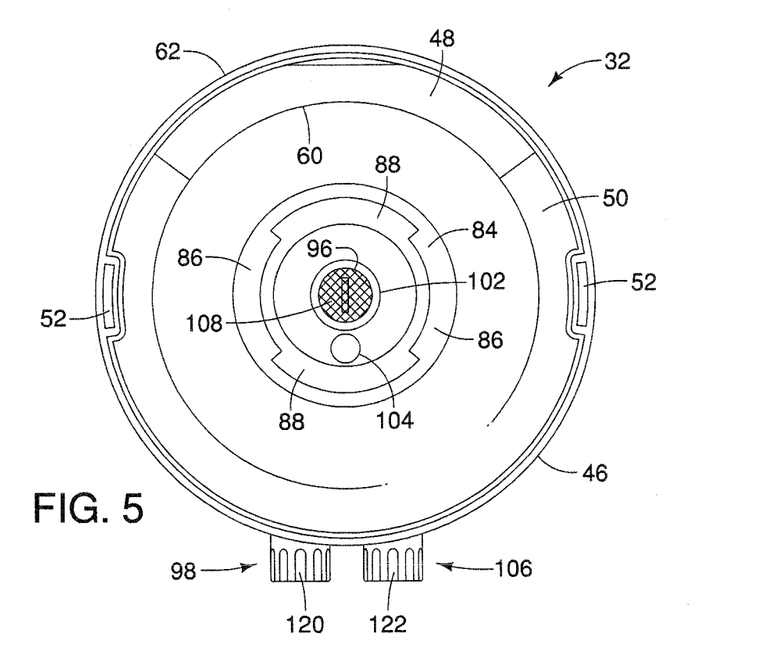
FIG. 5 is a top view of the filter base of FIG. 3.
Figure 6:
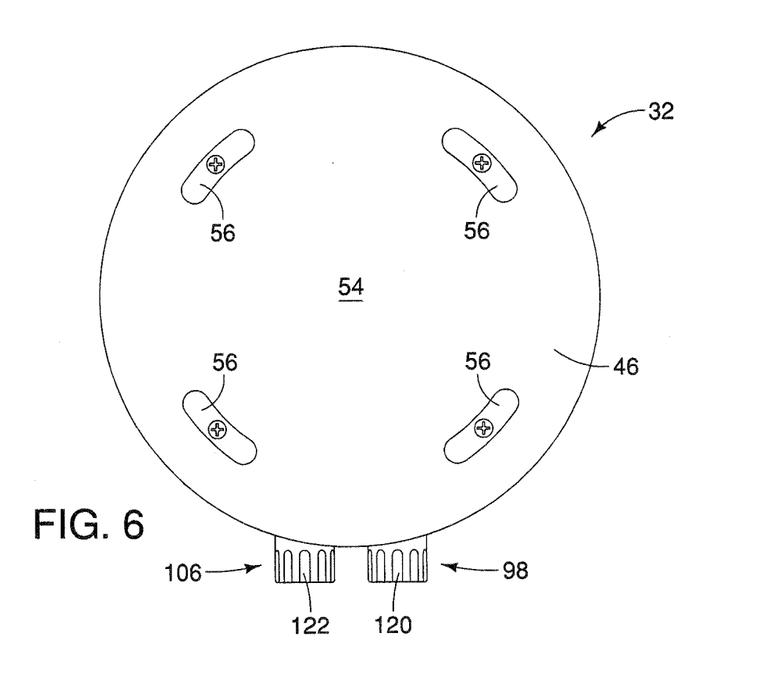
FIG. 6 is a bottom view of the filter base of FIG. 3.

Referring specifically to FIGS. 3-6, the filter base 32 includes a bottom support 46 having a generally circular cross-section and a curved vertical support 48 that transversely extends from the bottom support. The bottom support 46 has an upper surface 50 including opposing slots 52 for securing the cover 38 in position as described below. Also, a bottom surface 54 of the bottom support 46 includes a plurality of spaced feet 56 that are preferably made with a non-slip material such as rubber. The feet 56 prevent the filter base 32 from slipping or sliding on a counter or other underlying surface. As shown in FIGS. 2, 4 and 5, the vertical support 48 is curved inwardly or has a generally concave shape to correspond to an outwardly curved outer surface 58 of the filter cartridge 34. Thus, after the filter cartridge 34 is seated in the base 32, the outer surface 58 of the cartridge is directly adjacent to an inner surface 60 of the vertical support 48 to provide axial support to the filter cartridge. The opposing side or outer surface 62 of the vertical support 48 includes a visual light display 64, a battery housing 66, a pair of reset buttons 68a and 68b, and a de-activation actuator or button 70.

The visual light display 64 includes a series of visual indicators, preferably lights that are generally, vertically aligned. The top two lights 72 and 74 are single lights. Below these lights are two groups of lights 76 and 78 where each group includes four independent, generally oval-shaped lights 80 and 82. It is contemplated that the lights may have any suitable shape or configuration on the light display. Preferably, the lights 72, 74, 80 and 82 are each light emitting diodes (LEDs) but may be any suitable type of illuminating indicator. In the illustrated embodiment, each of the lights 72, 74, 80 and 82 illuminates or darkens independently of and sequentially relative to the other lights in the light display 64. For example, all of the lights in each of the groups of lights 76 and 78 start out being illuminated and then the topmost light in each of the groups darkens, followed by the light directly below the topmost light and so forth. Also, the lights may all be one color or a combination of colors depending on the application. Preferably, the lights are provided in distinguishable colors.

Power is provided to the lights 72, 74, 80 and 82 by batteries (not shown) stored in the battery housing 84. Alternatively, electrical power can be provided to the visual light display from an electrical outlet through a cord including electrical wiring connected to a plug.

First and second reset buttons 68a and 68b are respectively associated with the filter cartridge 34 and the enhancement cartridge 36. Each reset button 68a and 68b resets the time period for replacing the filter and enhancement media cartridges 34, 36. Thus, a user presses reset button 68a after replacing the filter cartridge 34, and presses reset button 68b after replacing the enhancement cartridge 36. Preferably, the first and second reset buttons 68a, 68b are spring-biased buttons as known in the art and are electrically connected by suitable wiring to the respective light groups 76, 78 on the light display 64.

The de-activation button 70 is also a spring-biased button that is configured to de-activate the first group of lights 76 associated with the enhancement cartridge 36. In some circumstances, the enhancement cartridge 36 is not needed such as when the incoming water already has sufficient minerals in it. A user can therefore remove the enhancement cartridge 36 from the filter cartridge 34 as described below so that additional minerals are not added to the filtered water. Pressing the de-activation button 70 disables or de-activates the lights in the first group of lights 76 so that the lights darken or go dark to indicate that the enhancement cartridge has been removed. As stated above, de-activation of the enhancement cartridge 36 is desirable when the water already has sufficient minerals in it or when certain users do not want one or more minerals in their water. It should be appreciated that the first and second reset buttons 68a, 68b and the de-activation button 70 may be any suitable actuators or buttons.

The bottom support 46 defines a generally circular receptacle 84 configured to receive the filter cartridge 34. The receptacle 84 is provided with a mounting ring by peripherally alternating bayonet-style tabs 86 and grooves 88 that engage corresponding tabs 90 and grooves 92 on a bottom surface 94 of the filter cartridge 34 to lock the filter cartridge to the filter base 32 in a push and twist motion as described below. A first opening 96 located in the center of the receptacle 84 is in fluid communication with an incoming water port 98 located on a peripheral surface 100 of the bottom support 46. An O-ring 102 is inserted in the first opening 96 to form a seal between the first opening and the filter cartridge 34. A second opening 104, which is adjacent to the first opening 96, is in fluid communication with an outgoing water port 106 on the peripheral surface 100 of the bottom support 46. Preferably, a screen 108 is positioned in the first opening 96 to remove any particles that may remain in the incoming water. A screen may also be positioned in the second opening 104 to further filter out any remaining particles and other matter in the outgoing water.

Figure 10:
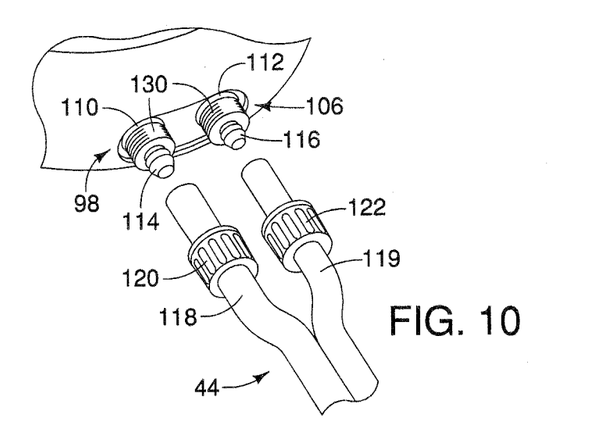
FIG. 10 is a fragmentary perspective view of the filter base showing the tubing being connected to the incoming and outgoing water ports of the filter base.
Figures 11, 12:
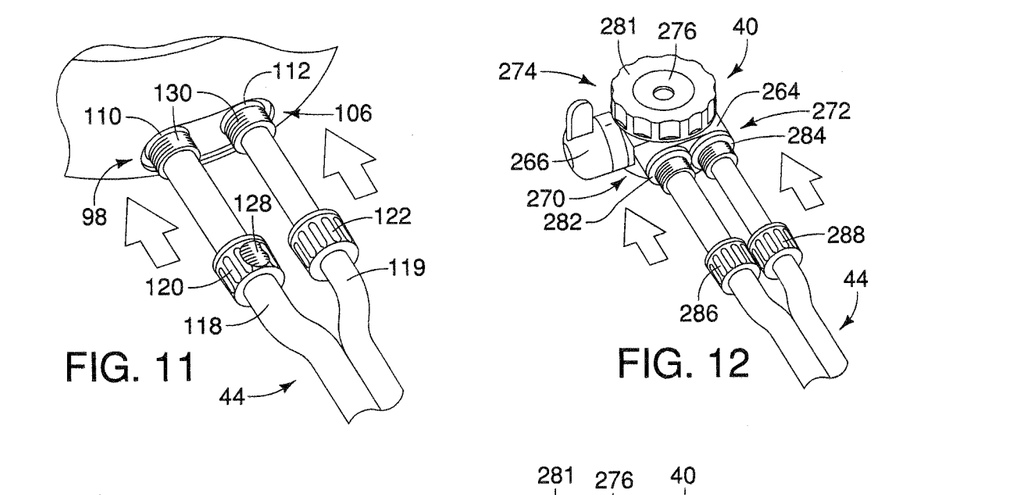
FIG. 11 is a fragmentary perspective view of the filter base showing the tubing connected to the incoming and outgoing water ports of the filter base.
FIG. 12 is a fragmentary perspective view of the diverter valve showing the tubing being connected to the incoming and outgoing water ports of the diverter valve.

As shown in FIGS. 10 and 11, the incoming and outgoing water ports 98, 106 each include threaded fittings 110, 112 having barbed nozzles 114, 116. The nozzle 114 for the incoming water port 98 has a diameter that is larger than a diameter of the nozzle 116 for the outgoing water port 106. By differentiating the diameters of the nozzles 114, 116 it is easier for a user to correctly connect the respective incoming and outgoing water tubes 118, 119 between the filter base 32 and the faucet 42. Two port caps 120, 122 (FIG. 4) having the same outer diameter each define through-holes 124, 126 and include internal threading 128 that respectively engages external threading 130 on each fitting 110, 112. The port cap 120 connected to the incoming water port 98 has an outer opening 132 (FIG. 4) with a diameter that is greater than a diameter of an outer opening 134 on the outgoing water port cap 122 to respectively receive ends of the incoming and outgoing water tubes 118, 119 connected to the faucet 42.

Figure 7:
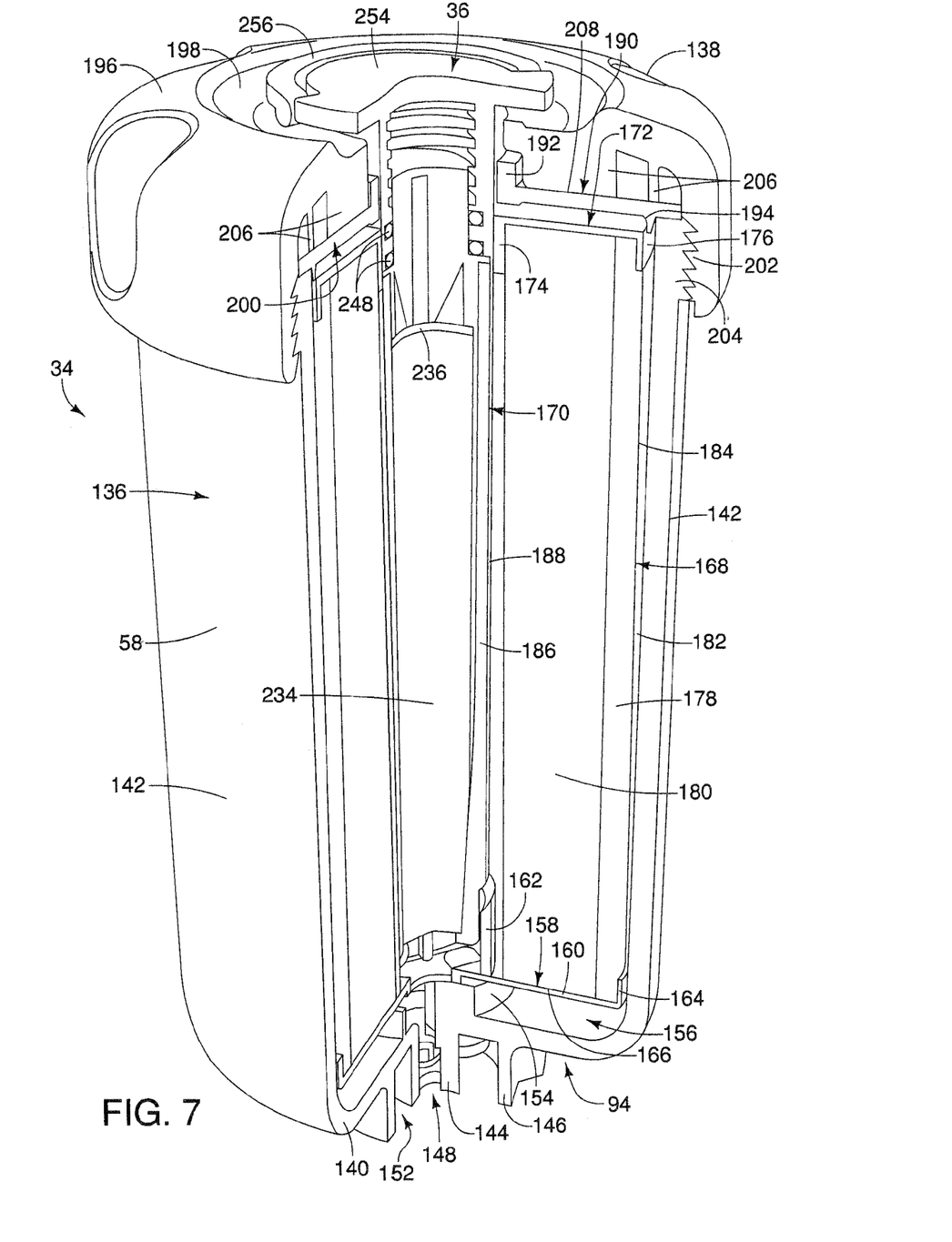
FIG. 7 is a fragmentary perspective view of the filter cartridge shown in FIG. 2.

Referring now to FIG. 7, the filter cartridge 34 includes a body 136 having a generally cylindrical shape and a cap 138 attached to the body. The body 136 includes a bottom wall 140 and a cylindrical wall 142 transversely extending from the bottom wall. Also, inner and outer annular flanges 144, 146 depend from the bottom wall 140. The inner flange 144 defines a generally circular inlet 148 for receiving incoming water from the faucet 42. A flow regulator is mounted inside the inlet to regulate the water flow into the filter cartridge. For example, a 0.9 gallon per minute (gpm) flow regulator is optionally attached to the inlet to limit the flow of water through the cartridge 34. The outer flange 146 defines an annular outlet 152 disposed radially outwardly from the inlet 148. Filtered water flowing out of the filter cartridge 34 exits through the outlet 152 and then flows to the outgoing water port 106 (FIG. 4). To securely connect the filter cartridge 34 to the filter base 32, bayonet-style tabs 90 and grooves 92 (FIG. 8) extend laterally from the outer flange 146 and rotatably engage the corresponding tabs 86 and grooves 88 in the receptacle 84 of the filter base 32.

On the inside of the filter cartridge 34, a cylindrical, support ring 154 extends upwardly from the bottom wall 140 and defines an annular flow channel 156 between the ring and the outer cylindrical wall 142.

A lower tray 158 is attached to and extends radially from the ring 156. The lower tray 158 includes a bottom support wall 160 and radially spaced inner and outer walls 162, 164 extending upwardly from the bottom wall where the inner wall is taller than the outer wall. A portion of the bottom wall 160 extending between the inner and outer walls 162, 164 forms a bottom support 166 for a filter element 168 as described below.

The pre-formed annular filter element 168 is seated on the bottom support 166 between the inner and outer walls 162, 164. The filter element 168 has a generally cylindrical shape and defines a central, axially-extending chamber 170 configured for receiving the enhancement cartridge 36 as described below. An upper tray 172 is attached to the filter element 168 and includes inner and outer radially spaced, depending walls 174, 176 along opposing sides of the filter element. In the illustrated embodiment, the filter element 168 preferably includes a radially outer filter layer 178 and an inner filter layer 180. The outer filter layer 178 is made of a non-woven, nanoalumina filter which removes bacteria and viruses from the incoming water. One such filter is a Nanoceram® filter manufactured by Argonide Corporation. The inner filter layer 180 is a carbon block that removes particulates, heavy metals, organic chemicals, chlorine, and unpleasant tastes and odors from the water. It should be appreciated that any suitable filter material or combination of filter materials may be used for the outer and inner filter layers 178, 180. It should also be appreciated that the filter element 168 may include one or more filter layers for filtering the incoming water.

Incoming water flows through the annular flow channel 156 and upwardly through an outer filter channel 182 defined between an outer surface 184 of the filter element 168 and the outer wall 142. After the incoming water passes through the filter element 168, the filtered water enters an inner filter channel 186 defined between an inner surface 188 of the filter element 168 and the enhancement cartridge 36. The filtered water travels upwardly through the inner filter channel 186 toward the top of the filter cartridge 34.

To properly secure the filter element 168 in the body 136 of the filter cartridge 34, an annular support plate 190 is positioned on the upper tray 172. The support plate 190 is a separate component that is not attached to or integrally formed with any other component in the filter cartridge 34. As shown in FIG. 7, the support plate 190 includes an upwardly extending annular wall 192 at a first end and a downwardly extending annular lip 194 near an opposing, radially outwardly spaced second end. The wall 192 provides support to the upper portion of the enhancement media cartridge 36 and the annular lip 194 guides the filter element 168 into position within the body 136.

The cap 138 has an upper side 196 defining a circular, recessed area 198 and a lower side 200 forming an inner space. An inner diameter of the cap 138 is generally the same as an outer diameter of the body 136 such that threads 202 on an inner surface of the cap engage corresponding threads 204 on the outer surface of the body. The lower side 200 of the cap 138 includes at least one, and preferably two, downwardly extending arms 206 that exert pressure on an upper surface 208 of the support plate 190 as the cap 138 is threaded onto the body 136. During operation of the filter system 30, the pressure on the support plate 190 by the arms 206 secures the filter element 168 in position on the bottom support 166 of the lower tray 158.

Figures 8, 9:
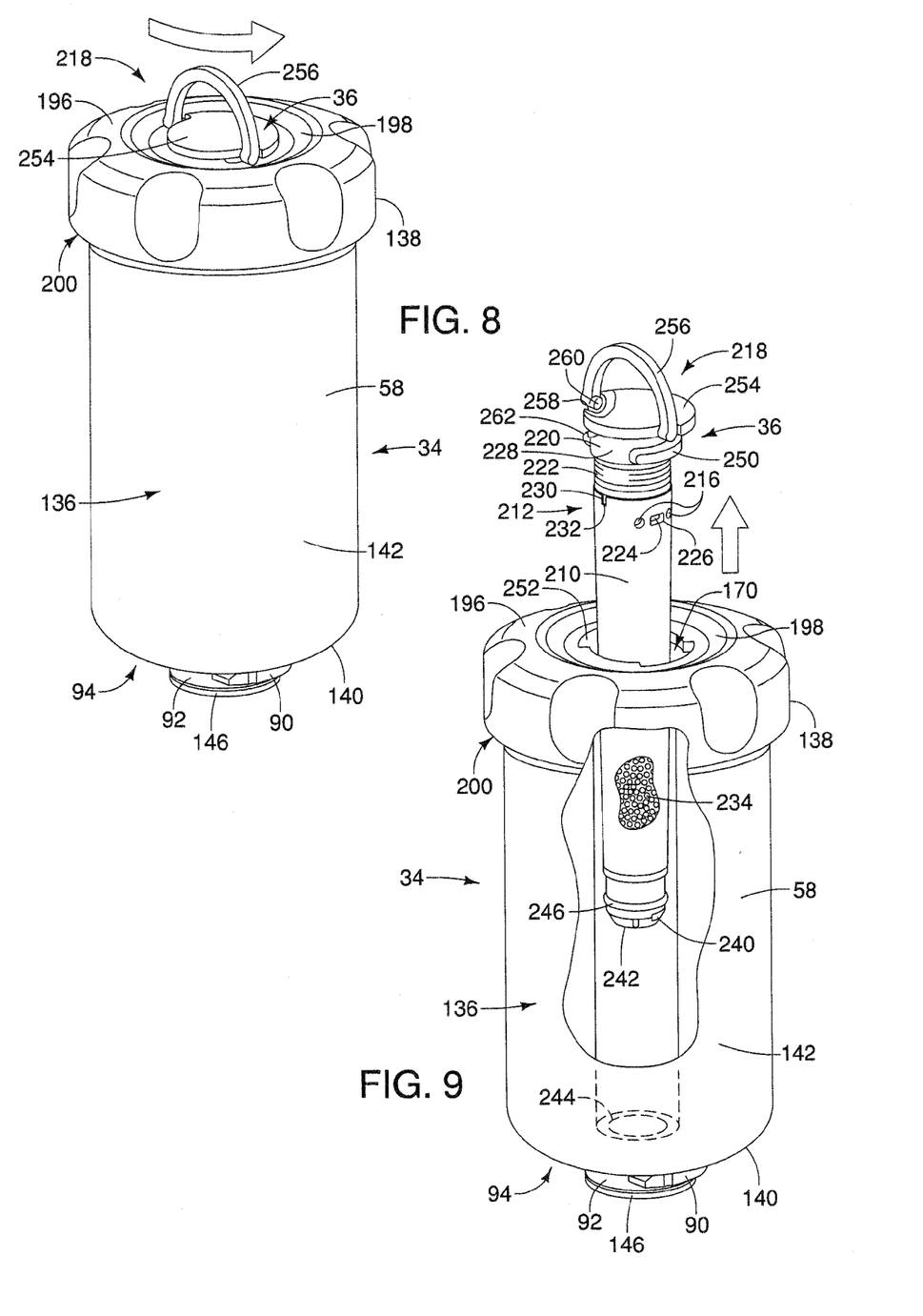
FIG. 8 is a fragmentary perspective view of the filter cartridge including the enhancement cartridge illustrating the direction of rotation for removing the enhancement cartridge from the filter cartridge.
FIG. 9 is a fragmentary perspective view of the enhancement cartridge partially removed from the filter cartridge.

Referring now to FIGS. 8 and 9, the removable enhancement cartridge 36 is configured to fit within the central chamber 170 defined by the filter element 168. The enhancement cartridge 36 includes an elongated cylindrical housing 210 having an upper end 212 and a bottom end 214. The upper end 212 of the housing 210 defines a pair of through holes 216 which receive the filtered water from the inner filter channel 184. A handle member 218 is removably attached to the upper end 212 of the housing 210 and has a generally cylindrical base portion 220 and a connecting portion 222. The connection portion 222 connects to the upper end 212 of the housing 210 by suitable threading or any suitable connector or connection method. On opposing sides of the handle member 218 are biased tabs 224 that engage corresponding openings 226 on the housing 210 to secure the handle member 218 to the enhancement cartridge 36.

As shown in FIG. 9, a flange 228 transversely extends from the handle member 218 between the connecting portion 222 and the base portion 220. Opposing alignment tabs 230 (FIG. 9) extend downwardly from the flange 228 and engage corresponding grooves 232 on the housing 210 for aligning the handle member 218 upon connection with the housing. After assembly, the tabs 230 are seated within the corresponding grooves 232 on the housing 210 and fit within the corresponding tab openings 226. The tabs 230 are biased into the grooves 232 to secure the handle member 218 on the housing 210.

The interior of the enhancement cartridge 36 and, more specifically, the housing 210 has a hollow interior to hold the granular enhancement media material 234. It should be appreciated that any suitable enhancement media material may be filled or placed in the interior of the housing 210. The removable handle member 218 prevents the enhancement media material 234 from falling out of the top of the housing 210 during use. When the enhancement media material 234 is spent, the handle member 218 is removed and the spent enhancement media material is removed and replaced.

To prevent the enhancement media material 234 from clogging the through holes 216, a cylindrical plate-like filter 236 is placed in a recess 238 in the bottom of the handle member. Specifically, the filter 236 is positioned between the handle member 218 and the enhancement media material 234. The bottom end of the housing 210 includes a screen 240 that allows the filtered water to flow out of the enhancement cartridge 36 and prevents the enhancement media material 234 from entering the filter base 32. As shown in FIG. 9, the bottom of the enhancement cartridge 36 has a cross-shaped support 242 that engages a corresponding recess 244 in the bottom of the filter cartridge 34 to support the enhancement cartridge 36 within the filter cartridge. An O-ring 246 is attached to the bottom of the housing 210 to form a seal between the enhancement cartridge 36 and the filter cartridge 34 that prevents incoming water from moving upwardly through the central chamber 170 of the filter cartridge.

The housing 210 defines an interior receptacle having threads which engage threads (not shown) on the handle member. Also, a pair of spaced O-rings 248 are attached to the handle member 218 for forming a seal between the enhancement cartridge 36 and the upper end of the central chamber 170 of the filter cartridge 34. The O-rings 248 prevent filtered water from exiting through the top of the filter cartridge 34. A pair of opposing flange members 250 transversely extend from the handle member 218 and engage corresponding grooves 252 (FIG. 9) on the filter cartridge 34 for locking the enhancement cartridge 36 in place relative to the filter cartridge. A circular cover member 254 on the top of the handle member 218 has a diameter which is larger than a diameter of the lower portion of the handle member.

To aid in the installation or removal of the enhancement cartridge 36 from the filter cartridge 34, a generally D-shaped handle 256 is pivotally connected to the cover member 254. Specifically, the cover member 254 includes opposing recesses 258 which are engaged by pins 260 extending from the D-shaped handle 256. A stop 262 extends radially from an outer surface of the handle member 218 and prevents the handle 256 from moving downwardly past the cover member 254. As shown, the handle 256 is flush with the cover member 254 when it is in a storage position (FIG. 2) and extends generally transversely to the cover member 254 when it is in a use position (FIG. 9). In the use position, a user grabs the handle 256 and twists or rotates it relative to the filter cartridge 34 to remove and replace the enhancement cartridge 36. The handle 256 can then be moved to the storage position when not in use.

There are situations where the enhancement cartridge 36 is not needed or is not necessary such as when the incoming water already has sufficient minerals in it. In such a situation, a user removes the enhancement cartridge 36 from the filter cartridge 34 and then removes the handle member 218 from the housing 210. The handle member 218 is then re-inserted into the filter cartridge 34 and then turned to lock the handle member in place relative to the filter cartridge. This configuration allows filtered water to pass through the central chamber 170 without passing through the enhancement cartridge 36. The enhancement cartridge 36 can then be replaced when needed. Also, to indicate that the enhancement cartridge 36 has been removed from the filter cartridge 34, a user presses the de-activation button 70, which de-activates or darkens the first group of lights 76.

Referring now to FIGS. 1 and 10-13, the diverter valve 40 and the incoming and outgoing tubes 118, 119 are used to transfer incoming raw water to the filter system 30 and return filtered water to the faucet 42 to be dispensed to a user. The diverter valve 40 includes a generally cylindrical body 264 having a lever 266 that extends transversely from the body and a spigot 268 that extends downwardly from a bottom surface of the body. A pair of incoming and outgoing valve ports 270, 272 extend transversely from the body 264. An upper portion 274 of the body 264 includes a cylindrical extension 276 that has threads 278 for engaging threads 280 on an interior surface of a faucet connector 281. The diverter valve 40 may be a ball valve or any other suitable type of valve as known in the art. The lever 266 is moveable between a first position and a second position. In the first position, raw water from a household water supply is diverted to the filter system 30, filtered and returned to the faucet 42 where the filtered water exits through the spigot 268 into a glass or other container. When the lever 266 is moved to the second position, the diverter valve 40 blocks the outgoing port 272 connected to the filter system 30 and allows the incoming raw water to go directly to the spigot 268 and out into a container. The unfiltered water is typically used for cleaning or washing dishes.

Figure 13:
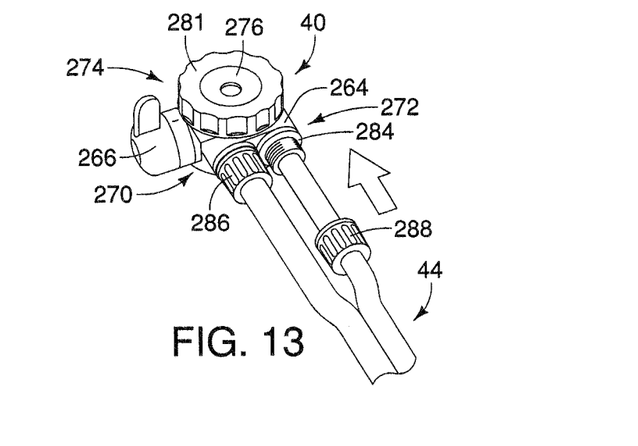
FIG. 13 is a fragmentary perspective view of the diverter valve showing the tubing connected to the incoming and outgoing water ports of the diverter valve.

Once mounted on the faucet 42, the tubing 44, and more specifically, the incoming water tube 118 and the outgoing water tube 119, are connected to the incoming and outgoing ports 270, 272 on the diverter valve 40. Specifically, the incoming water tube 270 has a larger diameter than the outgoing water tube 272 and therefore fits over larger nipple fitting 282 on the diverter valve 40. Similarly, the outgoing water tube 119 has a smaller diameter and therefore fits over the smaller nipple fitting 284 on the diverter valve 40. Threaded caps 286, 290, which are slid over the corresponding tubes as shown in FIGS. 12 and 13, are then moved into contact with the nipple fittings 282, 284 and are threaded onto the fittings to hold the tubes in place on the diverter valve 40.

The opposing ends of the tubes are then secured to the ports 98, 106 on the bottom support 46 of the filter base 32. Specifically, the larger tube 118 fits onto the corresponding nipple 108 on the filter base 32 and the other tube 119 fits over the corresponding nipple 130 of the filter port 106. The caps 120, 122 are threadingly engaged with the ports to hold the tube ends in engagement with the filter base 32.

Referring now to FIGS. 1 and 2, the cover 38 is shown and includes a generally cylindrical hollow body 290 that fits over the filter cartridge 34 and engages the bottom support 46 of the filter base 32. Specifically, the bottom of the cover 38 includes downwardly depending securing tabs 292 (FIG. 2) that engage the slots 52 in the bottom support 46 to hold the cover in position on the filter base 32. As shown in FIG. 2, the cover 38 includes four windows 294, 296, 298 and 300 that align with the visual indicators on the filter base. The windows are made of a substantially translucent or translucent material to allow the lights to be seen through the windows by a user. The first, topmost window 294 aligns with light 72 and indicates the battery power level. Similarly, the second window 296 aligns with light 74 and indicates the flow level within the filter system, the third window 298 aligns with the first group of lights 76 and indicates the remaining capacity of the enhancement cartridge 36, and the fourth window 300 aligns with the second group of lights 78 and indicates the remaining filtering capacity of the filter cartridge 34.

In operation, when a user wants to dispense filtered water from the faucet 42, the user moves the lever 266 on the diverter valve 40 to the first position or the filter position. This diverts the raw water coming from the water supply through the faucet 42 and the filtered water tube 118 to the filter base 32. The water then moves through the incoming water port 98 and the inlet 148 of the filter cartridge 34. As shown in FIG. 7, the raw water enters the inlet 148 and passes through the flow regulator or flow controller 150. The flow controller 150 controls the flow rate of the incoming water through the filter cartridge 34. After leaving the flow controller 150, the water moves through the annular flow channel 156 and into the outer filter channel 182. The water moves upwardly within the channel 182 and then laterally through the filter element 168. As the water moves through the outer filter layer 178, bacteria and viruses from the water are removed. Also, when the water moves through the inner filter layer 180, it passes through the carbon block which removes particulates and other substances as described above.

The filtered water now moves upwardly through the inner filter channel 186 located between the enhancement cartridge 36 and the inner side of the filter element 168. The water flows upwardly until reaching the through holes 216 defined by the upper end 212 of the enhancement cartridge 36.

The water passes through the through holes 216 and then moves downwardly through the filter 236 and the enhancement material 234. As the water moves through the central chamber 170 of the filter cartridge 34, the enhancement media material 234 adds minerals to the filtered water such as calcium, magnesium and other desired minerals. The filtered water then exits through the outlet 152 at the bottom of the cartridge 34 and into the outgoing water port 106 of the filter base 32. The water then leaves the filter base 32 and travels through the filtered water tube or outgoing tube 119 to the diverter valve 40 which directs the water through the spigot 268 and out into a glass or other container for use.

To use unfiltered water for cleaning or washing dishes, the user simply rotates the lever 266 on the diverter valve 40 to the unfiltered water position. In this position, the diverter valve 40 blocks the outgoing filter port 272 so that the raw water moves directly to the spigot 268 and into the sink.

Over the course of time, the filter media material in the filter cartridge 34 loses capacity to filter the raw incoming water. Typically, under normal use, the filter media material will last for about one year. At this point, a user removes the filter cartridge 34 from the filter base 32 and presses the release button 70 on the filter base to unlock the filter cartridge. The user then rotates the filter cartridge 34 relative to the filter base 32 and lifts it off the filter base to be replaced. If the enhancement cartridge 36 also needs to be replaced, the filter cartridge 34 including the enhancement cartridge, is replaced as a unit with a new filter cartridge and new enhancement media cartridge. If the enhancement cartridge 36 does not need to be replaced, then the user simply twists and removes the enhancement cartridge from the filter cartridge 34 and inserts the enhancement cartridge into a new filter cartridge.

If only the enhancement cartridge 36 is spent or has lost capacity, the user removes this cartridge as described above (FIGS. 8 and 9) and rotates the enhancement cartridge to the release position. To do this, a user lifts the handle 256 on the handle member 218 and then twists the enhancement cartridge until it is in the release position. The user then lifts the enhancement cartridge 36 out of the filter cartridge 34 and replaces it with a new enhancement cartridge. To secure the new enhancement cartridge 36 in the filter cartridge 34, a user pushes the new enhancement cartridge down into the central chamber 170 of the filter cartridge 34 and then turns it to the locked position. The user replaces the cover 38 over the filter cartridge 34 and secures it to the filter base 32 as described above. The filter system 30 is now ready to be used again.

The present filter system 30 is convenient to use and easy to set up in any household or building because it sits on the top of counter and does not have to be mounted under the sink or any other place in the household. Furthermore, conventional filter systems have filter including filter media material and enhancement media material that are fixed within the filter housing. Therefore, the entire filter cartridge 34 must be replaced when one or both of the materials are spent. This increases the cost of the filter cartridges and the expense to the consumer. The present filter system 30 overcomes this problem by having an independently replaceable enhancement cartridge 36 that is removably secured to the filter cartridge 34 so that one or the other of the filter cartridges can be replaced thereby decreasing manufacturing expenses and costs to the consumer.

While a particular embodiment of the present filter system has been described herein, it will be appreciated by those skilled in the art that changes and modifications may be made thereto without departing from the invention in its broader aspects and as set forth in the following claims.

The invention claimed is:

1. A water filter system comprising:
    a base including a bottom support and a vertical support transversely extending from said bottom support, said bottom support including an incoming water port for receiving unfiltered water and an outgoing water port for receiving filtered water;
    a filter cartridge including a body having threads, a cap having threads, a filter element in said body, a water inlet and a water outlet, wherein said threads on said cap matingly engage said threads on said body to enable said cap to be removed from and re-connected to said body, said cap defining an opening in communication with an interior of said body, said filter cartridge being connected to said base adjacent to said vertical support, said water inlet and said water outlet being respectively in fluid communication with said incoming water port and said outgoing water port;
    an enhancement cartridge configured to be inserted through said opening and connected to said body, said enhancement cartridge being in fluid communication with said filter cartridge and including an enhancement material for adding minerals to the filtered water, said enhancement cartridge being independently removable from said body through said cap while said filter cartridge is connected to said base and including a housing and a handle member attached to said housing, said handle member including a handle configured to move between a storage position and a use position for removing the enhancement cartridge from the filter cartridge, said handle member including a stop wherein said handle engages said stop when it is moved to said storage position; and
    a cover configured to enclose said filter cartridge and said vertical support and engage said bottom support.

2. The water filter system of claim 1, wherein said base includes a receptacle having a first opening in fluid communication with said incoming water port and a second opening in fluid communication with said outgoing water port, said filter cartridge being configured to engage said receptacle.

3. The water filter system of claim 1, wherein said at least one filter element includes an outer filter layer and an inner filter layer, said outer filter layer including a material for removing bacteria and viruses from the water and said inner filter layer including a material for removing at least one of particulates, sediments, harmful metals and odors from the water.

4. The water filter system of claim 3, wherein said outer filter layer includes a non-woven, nanoalumina filter and said inner filter layer includes a carbon block.

5. The water filter system of claim 1, wherein said filter cartridge includes a support plate seated on said filter, said support plate including an inner wall configured to support said enhancement cartridge and an alignment tab configured to engage an outer surface of said filter for aligning said filter within said filter cartridge.

6. The water filter system of claim 5, wherein said cap includes at least one downwardly extending arm that contacts and applies pressure to said support plate when said cap is secured to said body.

7. The water filter system of claim 1 further comprising a diverter valve connected to the faucet, said diverter valve including a body, a lever rotatably connected to said body and a spigot, said lever being movable between a first position where the water is directed to said base and a second position where the water is directed out of said spigot.

8. The water filter system of claim 7 further comprising a connector and an adapter, said adapter connected to the faucet and configured for securing said connector on the faucet, said connector including threads that engage threads on said diverter valve to secure said diverter valve to the faucet.

9. A water filter system comprising:
    a base including a bottom support and a vertical support transversely extending from said bottom support, said bottom support including an incoming water port for receiving unfiltered water and an outgoing water port for receiving filtered water;
    a filter cartridge including a body having threads, a cap having threads, a filter element in said body, a water inlet and a water outlet, and a support plate seated on said filter element, said support plate including an inner wall and an alignment tab configured to engage an outer surface of said filter element for aligning said filter within said filter cartridge, wherein said threads on said cap matingly engage said threads on said body to enable said cap to be removed from and re-connected to said body, said cap defining an opening in communication with an interior of said body, said filter cartridge being connected to said base adjacent to said vertical support, said water inlet and said water outlet being respectively in fluid communication with said incoming water port and said outgoing water port;

an enhancement cartridge configured to be inserted through said opening and connected to said body, said enhancement cartridge being in fluid communication with said filter cartridge and including an enhancement material for adding minerals to the filtered water, said enhancement cartridge being independently removable from said body through said cap while said filter cartridge is connected to said base, wherein said inner wall of said support plate is configured to support said enhancement cartridge; and a cover configured to enclose said filter cartridge and said vertical support and engage said bottom support.

10. The water filter system of claim 9, wherein said cap includes at least one downwardly extending arm that contacts and applies pressure to said support plate when said cap is secured to said body.

\* \* \* \* \*